(12) United States Patent
Deb et al.

(10) Patent No.: US 11,206,207 B1
(45) Date of Patent: Dec. 21, 2021

(54) MANAGED MULTICAST COMMUNICATIONS ACROSS ISOLATED NETWORKS

(71) Applicant: Amazon Technologies, Inc., Seattle, WA (US)

(72) Inventors: Bashuman Deb, Aldie, VA (US); Anoop Dawani, Kirkland, WA (US); Colm MacCarthaigh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 358 days.

(21) Appl. No.: 16/261,377

(22) Filed: Jan. 29, 2019

(51) Int. Cl.
| | |
|---|---|
| *H04L 12/761* | (2013.01) |
| *H04L 12/741* | (2013.01) |
| *H04L 12/46* | (2006.01) |

(52) U.S. Cl.
CPC .............. *H04L 45/16* (2013.01); *H04L 12/46* (2013.01); *H04L 45/745* (2013.01)

(58) Field of Classification Search
None
See application file for complete search history.

(56) References Cited

U.S. PATENT DOCUMENTS

| | | | |
|---|---|---|---|
| 8,543,554 B1 | 9/2013 | Singh et al. | |
| 8,560,663 B2 | 10/2013 | Baucke et al. | |
| 8,908,686 B1 * | 12/2014 | Ghosh | H04L 47/32 370/390 |
| 9,032,017 B1 | 5/2015 | Singh et al. | |
| 9,374,270 B2 | 6/2016 | Nakil et al. | |
| 2003/0174701 A1 * | 9/2003 | Angle | H04L 49/254 370/390 |
| 2004/0236726 A1 | 11/2004 | Ewing et al. | |
| 2004/0264477 A1 * | 12/2004 | Repko | H04J 3/0632 370/395.62 |
| 2007/0115813 A1 * | 5/2007 | Hyon | H04L 12/189 370/229 |
| 2010/0043067 A1 * | 2/2010 | Varadhan | H04L 45/16 726/13 |
| 2010/0135294 A1 * | 6/2010 | Asati | H04L 45/16 370/390 |
| 2011/0103259 A1 * | 5/2011 | Aybay | H04L 45/306 370/254 |
| 2011/0299531 A1 * | 12/2011 | Yu | H04L 45/745 370/392 |

(Continued)

OTHER PUBLICATIONS

U.S. Appl. No. 16/176,642, filed Oct. 31, 2018, Jamie Plenderleith.

*Primary Examiner* — Hassan A Phillips
*Assistant Examiner* — Gautam Sharma
(74) *Attorney, Agent, or Firm* — Robert C. Kowert; Kowert, Hood, Munyon, Rankin & Goetzel, P.C.

(57) ABSTRACT

Managed multicast communications may be implemented across isolated networks. A virtual traffic hub may be implemented that connects different isolated networks. A control plane for the virtual traffic hub may accept requests to enable a multicast group between different isolated networks connected to the virtual traffic hub. The multicast group may then be enabled at the virtual traffic hub so that requests to add members to the multicast group and data packets directed to the multicast group can be handled according to multicast protocols by the virtual traffic hub.

20 Claims, 8 Drawing Sheets

(56) References Cited

U.S. PATENT DOCUMENTS

| | | | |
|---|---|---|---|
| 2013/0329605 A1* | 12/2013 | Nakil | H04L 41/0659 |
| | | | 370/255 |
| 2015/0106805 A1* | 4/2015 | Melander | G06F 9/5072 |
| | | | 718/1 |
| 2017/0017692 A1 | 1/2017 | Das et al. | |
| 2018/0234259 A1* | 8/2018 | Du | H04L 12/1886 |
| 2018/0241823 A1* | 8/2018 | Dawani | H04L 63/0272 |
| 2019/0114337 A1* | 4/2019 | George | G06F 16/23 |

\* cited by examiner

MANAGED MULTICAST COMMUNICATIONS ACROSS ISOLATED NETWORKS

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each virtual machine being a software simulation acting as a distinct logical computing system that provides users with the illusion that they are the sole operators and administrators of a given hardware computing resource, which also provides application isolation and security among the various virtual machines. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Virtualization technologies have given rise to provider networks, which offer various services or resources to customers via network connections. As the amount of data, transactions, and other interactions with provider networks increase, so too do the various connection requirements for customers of provider networks. Some customers may wish to take advantage of specifying how network traffic is to be handled within provider networks using logically isolated networks within the provider network. Logically isolated networks may provide a customizable virtual networking environment for virtual computing resources hosted within a logically isolated network, allowing for optimized traffic routing, security, or connections to be established to use the virtual computing resources in the provider network. Thus, techniques that further extend the features logically isolated networks are highly desirable.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of managed multicast communications across logically isolated networks are described herein. Multicast may be implemented using various multicast communication protocols that deliver a single stream of data to many different recipients. A multicast group may identify the participants in a multicast communication or flow, including those sources of data that generate or otherwise send the data to the multicast group and the recipients of the data. Because multicast is well-suited for a group of clients all requesting access to the same data, it is a preferred protocol for providing data in many different applications, like streaming multimedia content and subscription data such as news articles, stock quotes, etc. to a select group of subscribers.

The disclosed managed multicast communications across logically isolated networks may beneficially improve the performance of managing and using a multicast network. For example, the disclosed managed multicast communications can provide elasticity and scalability to respond to changing demands upon the multicast group. Managed multicast communications can simplify what would otherwise be a complex configuration process, by providing a separate control plane interface for managing multicast communications. Managed multicast communications can connect variously situated logically isolated networks from within provider networks or other service platforms that host resources to privately managed resources, such as those resources implemented in an on premise data center or network.

Figure 1:
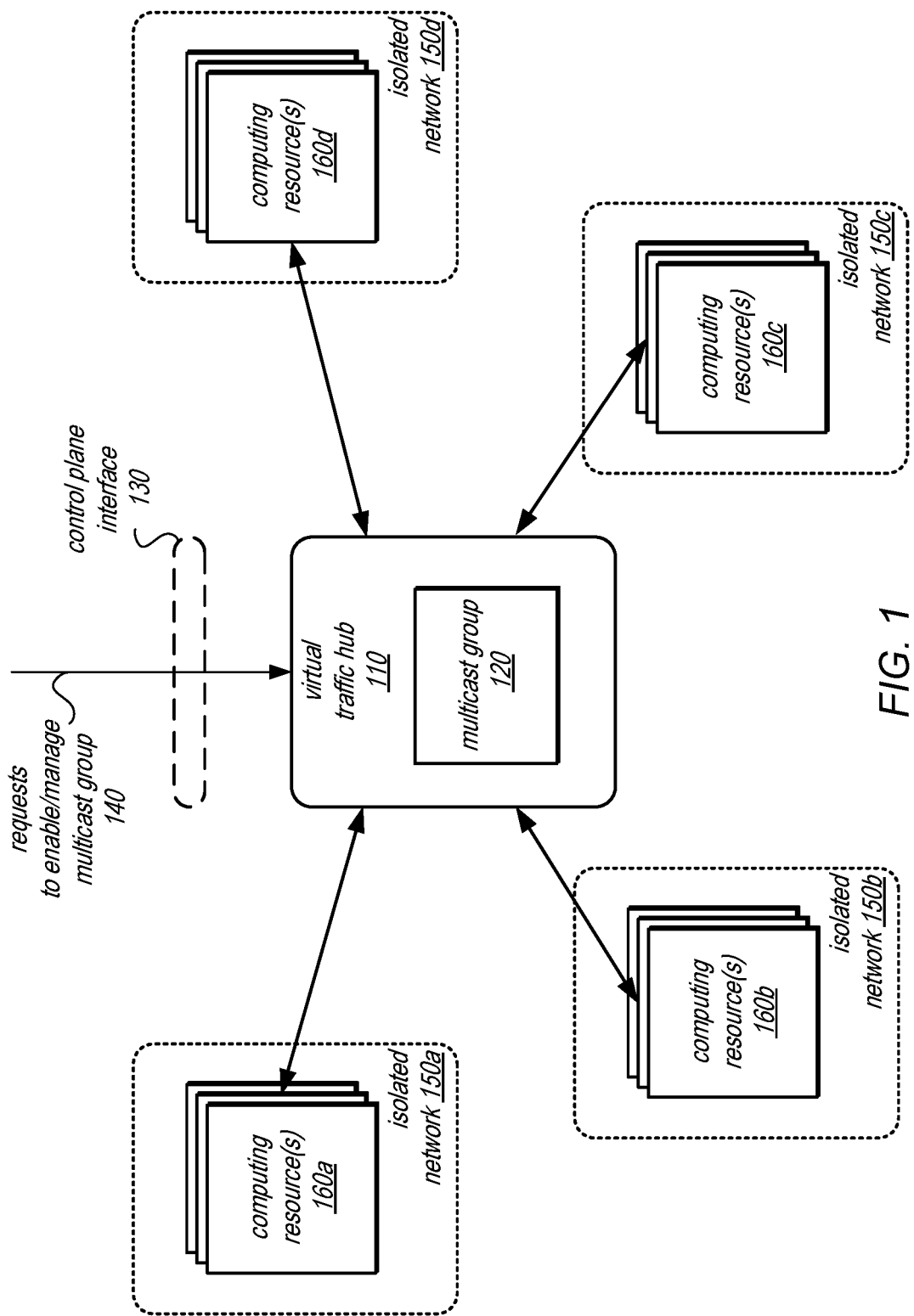
FIG. 1 is a logical block diagram of managed multicast communications across isolated networks, according to some embodiments.

FIG. 1 is a logical block diagram of managed multicast communications across isolated networks, according to some embodiments. Isolated networks, such as isolated networks 150a, 150b, 150c, and 150d may be physically isolated (e.g., a private network with specified access points, gateways, or other mechanisms for external communication) or logically isolated (which may also be referred to in some environments as a virtual private cloud or VPC and may include a collection of computing and/or other resources in a logically isolated section of a larger network (like a provider network), over which the responsible entity (e.g., user account) using the logically isolated network is granted substantial control with respect to networking configuration. In some embodiments, for example, a responsible entity may select the network address ranges (e.g., Internet Protocol (IP) address ranges or blocks via Classless Inter-Domain Routing (CIDR) notation) to be used for the logically isolated network resources, manage the creation of overlay networks, such as subnets within the logically isolated network, and the configuration of route tables, gateways, etc. for the logically isolated network, in order to provide similar control and configuration features of logically isolated networks as may be implemented for physically isolated networks.

Isolated networks 150 may include various computing resources, such as computing resource(s) 160a, 160b, 160c, and 160d. Computing resource(s) 160 (e.g., physical or virtual computers, servers, systems, instances, nodes, or other computing devices) may implement various applications or systems that utilize multicast to send information to multiple other destinations, in some embodiments, including computing resources located in other isolated networks. For example, many applications, databases, and storage solutions may allow multiple instances to execute simultaneously while providing a single unified front-end interface in order to provide clustering. Multicast may be used to configure high availability clusters. Some applications or systems may deliver multimedia content using multicast, as multicast offers the ability to send one signal to many encoders. In this way, recipients can ingest content originating outside of one isolated network (e.g., originating from a physically isolated private network outside of a logically isolated network within a provider network) natively, deliver content originating within a logically isolated network within a provider network to external isolated networks, and/or share content within across different isolated networks and infrastructures within a provider network. In another example, some applications may be Financial Service Industries (FSI) application to provide market data, such as stock market data, from multicast applications.

In various embodiments, a virtual traffic hub 110 may be implemented to support a multicast group 120 across the isolated networks 150. Virtual traffic hub 110, as discussed below, may connect to multiple isolated networks 150, which may be programmatically attached in a hub-and-spoke configuration to virtual traffic hub 110, in various embodiments, so that the routing/forwarding of data packets from one attached isolated network to another is managed by nodes of a virtual traffic hub 110 based on metadata and/or policies provided by the creating/using clients, applications, entities, and/or systems. Virtual traffic hub 110 may also be referred to as a transit gateway in some embodiments.

Isolated networks 150 attached to virtual traffic hub 110 may allow network configuration settings (e.g., network addresses assigned to resources within a given network, subnet configurations, security settings and the like) to be set independently for the different networks, without having to take other networks' configuration settings into account. For example, a range of isolated network addresses selected for resources within one isolated network may happen to overlap with a range of private network addresses selected for resources within another isolated network in various embodiments, since the two address ranges are selected independently. According to some embodiments, the metadata taken into consideration at virtual traffic hub 110 set up on behalf of a given client to manage traffic flowing between various isolated networks may include multiple route tables provided by the client (and/or route tables generated at the virtual traffic hub 110 based on other input provided by the client, such as forwarding information base (FIB) entries from which route table entries may be derived.) After the appropriate route tables have been associated and populated with entries, traffic may be allowed to start flowing between the isolated networks via virtual traffic hub 110 in various embodiments.

Virtual traffic hub 110 may support multicast group 120 by supporting multicast protocol and forwarding traffic directed to the multicast group 120 according to multicast routing provided to virtual traffic hub 110. Virtual traffic hub 110 can interpret various multicast protocols in order to support features such as adding or removing a computing resource from a multicast group 120 or performing forwarding of data packets in a multicast flow. Because virtual traffic hub 110 can automatically increase resources to meet increases in network traffic, virtual traffic hub 110 can dynamically respond to changes in multicast traffic, unlike statically configured multicast groups which may overwhelm the resources of a multicast router in some circumstances. Moreover, a separate control plane interface 130 (separate from multicast protocol), may allow requests 140 to enable or manage multicast group 120 at virtual traffic hub 110, without requiring complex configuration protocols or operations to be performed by a user that wishes to manage the multicast group. For example, as discussed below with regard to FIG. 4, multicast routing may be individually enabled (or disabled) for isolated networks, giving control to entities operating isolated networks 150 to participate (or not participate) in a multicast group.

Please note that previous descriptions are not intended to be limiting, but are merely provided as an example of isolated networks, computing resources, virtual traffic hubs, multicast groups, and interfaces. The number or arrangement of components may be implemented in many different ways.

This specification next includes a general description of a provider network, which may implement a network configuration service to provide managed multicast communications across isolated networks hosted within the provider network or external to the provider network. In this way, native support for multicast may be implemented for resources hosted within isolated networks hosted within the provider network or communicating with the provider network from external isolated networks. Then various examples of a provider network are discussed, including different components/modules, or arrangements of components/module that may be employed as part of implementing a network configuration service. A number of different methods and techniques to implement managed multicast communications across isolated networks are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
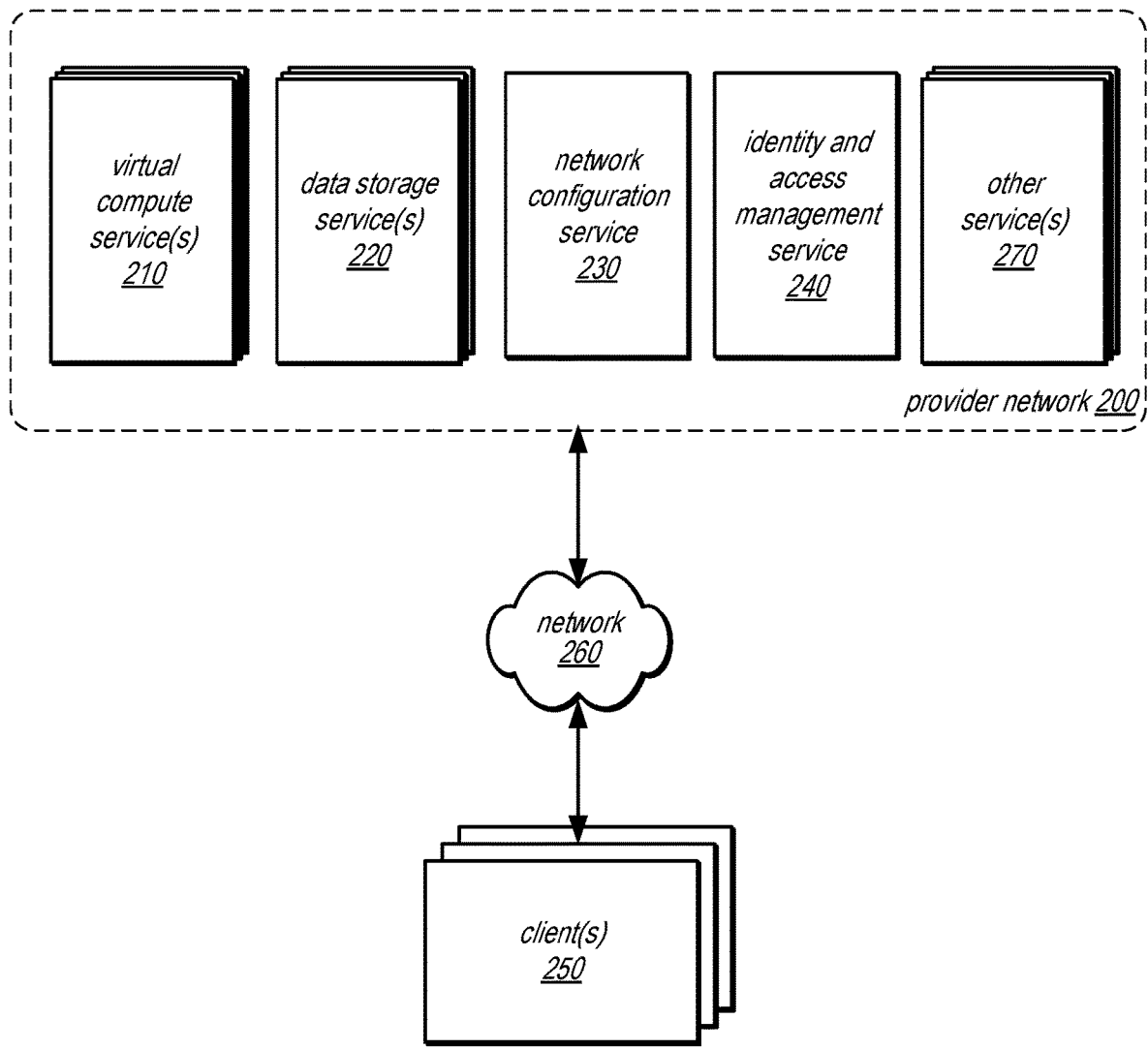
FIG. 2 is a logical block diagram of a provider network that implements a network configuration service that provides managed multicast communications across isolated networks, according to some embodiments.

FIG. 2 is a logical block diagram of a provider network that implements a network configuration service that provides managed multicast communications across isolated networks, according to some embodiments. Provider network 200 may offer various computing resources to clients, such as various types of data analysis, processing, and storage. Computationally intensive applications or systems may utilize multiple distributed computing resources in provider network 200 to provide scalable solutions for a variety of different computing applications. Provider network 200 may be may be set up by an entity such as a company or a public sector organization to provide one or more network-based services (such as various types of cloud-based computing or storage) accessible to clients (e.g., internal clients operating within provider network using provider network resources, or external clients, such as clients 250).

Provider network 200 may include numerous data centers hosting various resource pools, such as collections of physical and/or virtualized computer servers, storage devices, networking equipment and the like, needed to implement and distribute the infrastructure and services offered by the provider network 200. In at least some embodiments, provider network 200 may implement multiple fault tolerant zones, as discussed below with regard to FIG. 3, which may isolate failures to a particular zone such that a failure in or of one fault tolerant zone may not cause or trigger a failure in another fault tolerant zone (allowing computing resources in the other fault tolerant zone to continue operating in the event of a failure of another fault tolerant zone). Different data centers, isolated power or computing infrastructures, and/or other provider network architectures may be implemented to provide multiple fault tolerant zones (sometimes referred to as availability zones).

In some embodiments, provider network 200 may implement various computing resources or services, such as a virtual compute service(s) 210, data storage service(s) 220, (e.g., relational or non-relational (NoSQL) database query engines, map reduce processing, data flow processing, and/or other large scale data processing techniques, an object storage service, block-based storage service, or data storage service that may store different types of data for centralized access), network configuration service 230, identity and access management service 240, and other services 270 (any other type of network based services (which may include various other types of storage, streaming, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 13 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Virtual compute service(s) 210 may be implemented by provider network 200, in some embodiments. Virtual compute service(s) 210 may offer software container or other operating system virtualized services, such as Docker containers, in some embodiments. In some embodiments, virtual computing service 210 may offer instances and according to various configurations for client(s) 250 operation. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances and of provider network 200 in different embodiments, including general purpose or special purpose computer servers, storage devices, network devices and the like. In some embodiments instance client(s) 250 or other any other user may be configured (and/or authorized) to direct network traffic to a compute instance.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client(s) 250 applications, without for example requiring the client(s) 250 to access an instance. Applications (or other software operated/implemented by a compute instance and may be specified by client(s), such as custom and/or off-the-shelf software.

In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

Data storage service(s) 220 may implement different types of data stores for storing, accessing, and managing data on behalf of clients 250 as a network-based service that enables clients 250 to operate a data storage system in a cloud or network computing environment. For example, data storage service(s) 220 may include various types of database storage services (both relational and non-relational) for storing, querying, and updating data. Such services may be enterprise-class database systems that are highly scalable and extensible. Queries may be directed to a database in data storage service(s) 220 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

One data storage service 220 may be implemented as a centralized data store so that other data storage services may access data stored in the centralized data store for processing and or storing within the other data storage services, in some embodiments. A may provide storage and access to various kinds of object or file data stores for putting, updating, and getting various types, sizes, or collections of data objects or files. Such data storage service(s) 220 may be accessed via programmatic interfaces (e.g., APIs) or graphical user interfaces. A centralized data store may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In at least some embodiments, one of data storage service(s) 220 may be a data warehouse service that utilizes a centralized data store implemented as part of another data storage service 220. A data warehouse service as may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes).

Network configuration service 230, as discussed in detail below, may implement various networking features, such as virtual network endpoints, logically isolated networks (e.g., virtual private clouds), network traffic controls, and data packet processing features, like virtual traffic hubs for multicast routing. Unlike traditional on-premises multicast networks which may involve expensive and time consuming deployments and configurations, network configuration service 230 can provide a scalable and reliable multicast service that can be easily enabled with a small number of user interface actions or API calls. In this way, users of a provider network can migrate multicast applications to the provider network in order to simplify operations while maintaining a same degree of fairness and high availability that multicast has to offer. Network configuration service 230 may implement native multicast support for resources hosted in logically isolated networks in order to enable users to take advantage of elasticity and scalability of other provider network services for multicast applications and also enable users to leverage the scale of a large provider network (e.g., a global presence) to build a global multicast network. Instead of sending data to a group of receivers on a one-to-one basis (which is inefficient), multicast implemented for a provider network can reduce the traffic to external recipients (e.g., over a dedicated physical connection, public, or private gateway, as discussed below with regard to FIG. 3) by simultaneously delivering a single stream of information to thousands of receivers and eliminating the CPU penalty for user workloads in provider network 200 by avoiding needless replication of data for each recipient. Moreover, with multicast support in provider network 200, users can now leverage several provider network services to further innovate and enhance systems or applications built on top of the provider network services.

Identity and access management service 240 may implement various features to manage access to provider network 200 services and resources, such as multicast group at a virtual traffic hub as discussed below with regard to FIGS. 5 and 7. For example, identity and access management service 240 can provide fine grained access controls based on various criteria to determine whether access to a service or resource is allowed.

Clients 250 may encompass any type of client configurable to submit network-based requests to provider network 200 via network 260, including requests for storage services (e.g., a request to create, read, write, obtain, or modify data in data storage service(s) 230, etc.) or managed blockchain service 270 (e.g., a request to create a blockchain network). For example, a given client 250 may include a suitable version of a web browser, or may include a plug-in module or other type of code module that may execute as an extension to or within an execution environment provided by a web browser. Alternatively, a client 250 may encompass an application such as a database application (or user interface thereof), a media application, an office application or any other application that may make use of storage resources in data storage service(s) 230 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 220 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 220 may be coordinated by client 250 and the operating system or file system on behalf of applications executing within the operating system environment.

Clients 250 may convey network-based services requests (e.g., requests to manage a virtual traffic hub) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Provider network 200 may include the hardware (e.g., modems, routers, switches, load balancers, proxy servers, etc.) and software (e.g., protocol stacks, accounting software, firewall/security software, etc.) necessary to establish networking links between different components of provider network 200 as well as external networks (e.g., the Internet) or client networks with dedicated physical connections. In some embodiments, provider network 200 may employ an Internet Protocol (IP) or other network tunneling technology to provide an overlay network via which encapsulated packets may be passed through the provider network 200 using tunnels (which may be a substrate network upon which other networks, like logically isolated networks, and overlay networks, like subnets, may be implemented).

Figure 3:
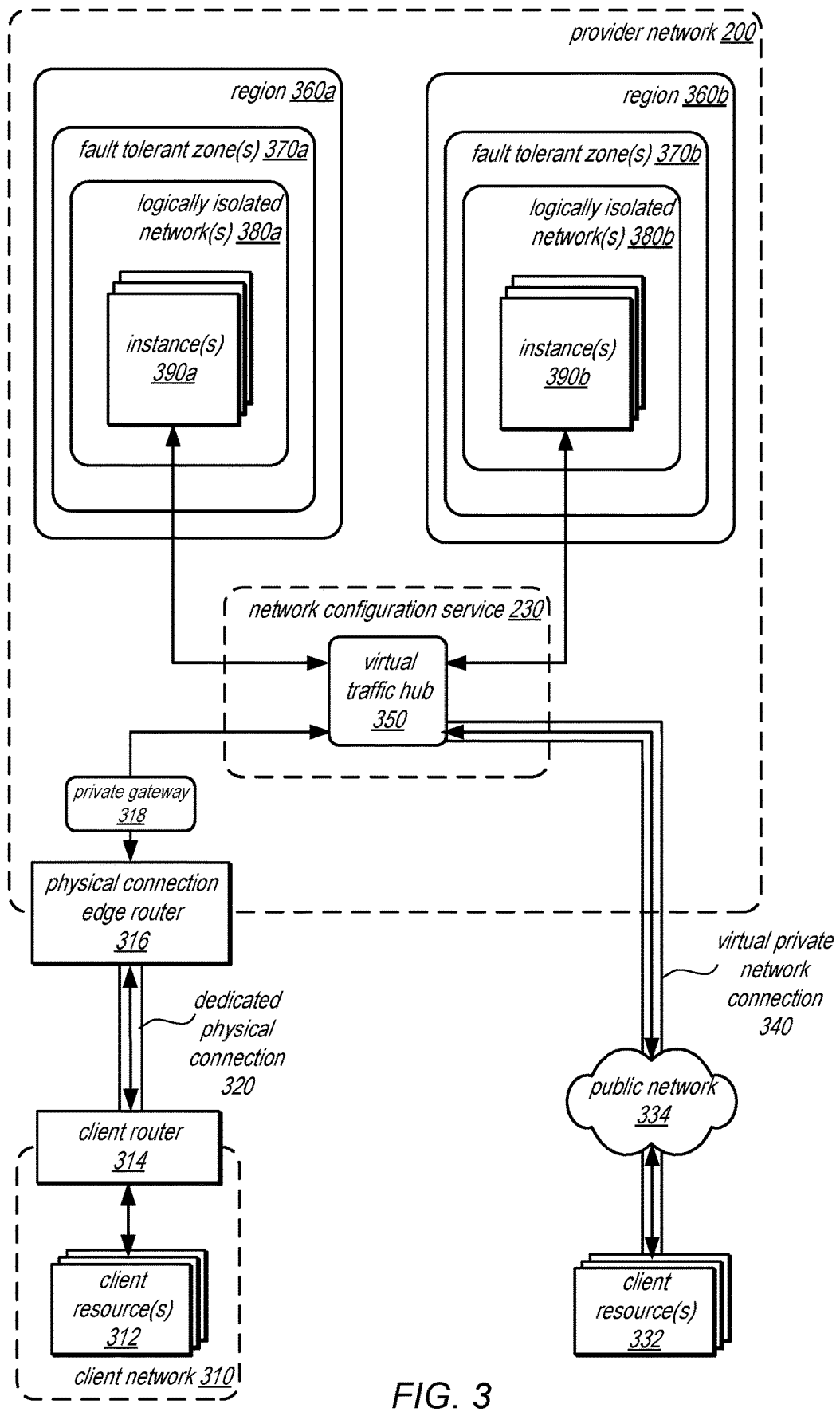
FIG. 3 is logical block diagram illustrating configurations of isolated networks and a virtual traffic hub, according to some embodiments.

FIG. 3 is logical block diagram illustrating configurations of isolated networks and a virtual traffic hub, according to some embodiments. Provider network 200 may organize the resources and infrastructure implementing provider network services in various ways. In some embodiments, provider network 200 may implement regions, such as regions 360*a* and 360*b*. Regions 306 may be geographical and may include multiple different data centers or provider network infrastructure locations within the same region 306. In some embodiments, communications between regions 306 may occur over a public network, like the Internet. Within a region, provider network 200 may implement fault tolerant zone(s), such as fault tolerant zone(s) 370*a* and 370*b*. Fault tolerant zones 370 may isolate failures to a particular fault tolerant zone 370 such that a failure in or of one fault tolerant zone 370 may not cause or trigger a failure in another fault tolerant zone 370.

Provider network 200 may allow for portions of provider network 200 within fault tolerant zone(s) 370 to be provisioned as a logically isolated network within or portion of provider network 200. Logically isolated network(s), like logically isolated network(s) 380*a* and 380*b*, may be created, managed, or maintained within fault tolerant zone(s) 370*a*, in some embodiments. Logically isolated networks 380 may allow a customer or user associated with a client account of provider network 200 to specify the configuration of the logically isolated network 370, utilizing features such as specifying a range of network addresses (e.g., via a CIDR block), creation of overlay networks, such as subnets (which may be specified with different CIDR blocks), create and/or manage network route tables and gateways (e.g., like a public gateway (not illustrated) or private gateway 318). One or more network devices for the logically isolated networks 380 may implement or enforce the specified network configuration, such as handling requests received via private gateway 318 and a public gateway according to the parameters or configuration of those gateways, in some embodiments.

Like provider network 200, a client network 310 may offer or provide various applications or services to users of the client network 310, utilizing resources such as client resource(s) 312. For example, client network 310 may be one or more internal networks for one (or multiple) companies, enterprises or organizations. In some embodiments, client network 310 may provide publicly available services, which may be accessible via a public network like the Internet. As part of providing the respective services or functions, client network 310 may utilize various resources offered by provider network 200.

In order to enable connectivity between a client network 310 and provider network 200, a dedicated physical connection 320 may be implemented. For example, the dedicated physical connection 320 may include one or cables physically linking a pair of co-located routers, one belonging to or managed by the provider network (e.g., physical connection edge router 316) and one belonging to or managed by a client network (e.g., client router 314). However in some embodiments, a third party or entity may operate one or both of physical connection edge router 316 or client router 314. In at least some embodiments, the physical connection edge router 316 and the client router 314 may be located within a co-location facility. However, in other embodiments the two routers may not be located within a same facility or location.

In various embodiments, dedicated physical connection 320 may be utilized to provide a connection and interface to resources in provider network 200 via a private gateway 318. In at least some embodiments, private gateway 318 may be a physical or virtual network gateway to access resources according to a private connection, such as dedicated physical connection 320. For example, private gateway 318 may enforce or otherwise implement access controls or security protocols to ensure that the network traffic received through private gateway 318 remains private to the client and destination resource that are communicating. In order to establish a private gateway 318, control request that the private gateway 318 be established over the already established dedicated physical connection 318 can be received. Various parameters may have to be supplied to an administrative component of provider network 200. These parameters may include, for example, one or more of: (a) a VLAN (virtual local area network) identifier or tag that complies with the Ethernet 802.1Q standard, (b) an Internet Protocol (IP) prefix, address range or address, (c) a Border Gateway Protocol (BGP) Autonomous System Number (ASN), or (d) a BGP key. Once established, various systems, components, or client resource(s) 312 in client network 310 may communicate with resources in provider network 200 through the private gateway 318.

In some embodiments, client resources, such as client resources 332, may be able to connect to logically isolated networks 380 via public network 334 (e.g., a wide area network like the Internet) over a virtual private network connection 340. In this way, client resource(s) 332, which may be publicly hosted (or hosted within another provider network that is publicly available) can connect to provider network 200 over public networks while maintaining privacy.

Service resources, such as virtual compute instances 390a and 390b, may be resources of one or multiple different services offered by provider network 200 (e.g., virtual compute, data processing, data storage, etc.) that may be hosted within logically isolated network(s) 380 and may participate in a multicast group. Similarly, client resource(s) 312 or 332 may encompass any type of application that can utilize, manage, operate a multicast group in provider network 200. A virtual traffic hub 350 may be created, provisioned, and assigned by an entity within provider network 200. A request to network configuration service 230 may be made (e.g., associated with a provider network account) to create virtual traffic hub 350. Requests to attach, link or otherwise facilitate communications between virtual traffic hub 350 and instance(s) 390a, 390b, client resource(s) 312, and client resource(s) 332 may be performed via control plane for network configuration service 230. Virtual traffic hub 350 may be a shared resource in provider network so that different entities (e.g., associated with different provider network accounts or externally operated resources) can participate in a multicast group supported by virtual traffic hub 350.

Figure 4:
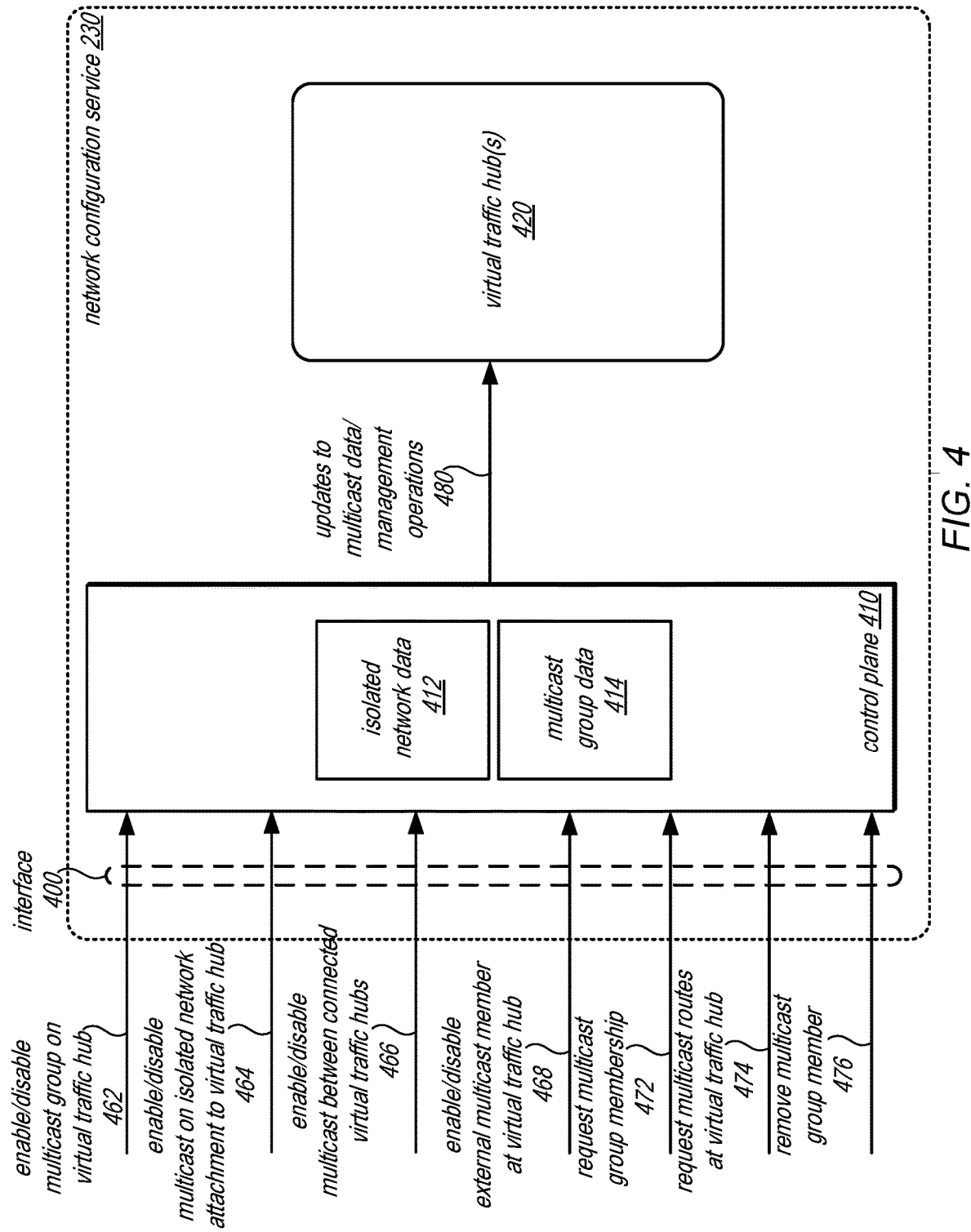
FIG. 4 is a logical block diagram illustrating interactions to manage a multicast group at a virtual traffic hub, according to various embodiments.

FIG. 4 is a logical block diagram illustrating interactions to manage a multicast group at a virtual traffic hub, according to various embodiments. Interface 400 may be a command line interface, programmatic interface (e.g. APIs), and/or graphical user interface to support different network configuration requests at control plane 410 of network configuration service 230. For example, a request to enable or disable a multicast group on a virtual traffic hub 462 may be received via interface 400. Request 462 may include various information, such as an identifier for the virtual traffic hub (as multiple virtual traffic hubs could be implemented to connected different isolated networks) and a parameter value to enable multicast set to "TRUE" in some embodiments. Similarly, as indicated at 464, a request to enable or disable multicast on an isolated network attached (e.g., connected) to a virtual traffic hub may be received via interface 400 (e.g., by specifying an attachment identifier for the virtual traffic hub attachment to the logically isolated network and a parameter value to enable multicast set to "TRUE"). In addition to connections between resources and virtual traffic hubs, virtual traffic hubs may also be connected. Thus, as indicated at 466, a request to enable or disable multicast between connected virtual traffic hubs may be received via interface 400.

In some embodiments, control plane 410 may enforce restrictions upon requests to enable or disable multicast for virtual traffic hubs, isolated network attachments, and or connections between virtual traffic hubs. For example, enabling multicast (or disabling) 462 for a virtual traffic gateway may be limited to the creator or owner of the virtual traffic gateway. Another user account, for instance, with a logically isolated network attached to the virtual traffic hub could be allowed to enable multicast for that logically isolated network without being allowed to enable or disable multicast on the connected virtual traffic hub. Similarly, a number of connections to virtual traffic hubs with multicast enabled may be limited (e.g., only 1 connection to a virtual traffic hub with multicast enabled may be permitted).

As indicated at 468, one or more requests to enable or disable an external multicast member at a virtual traffic hub may be performed via interface. For example, the client resources 314 of client network 310 in FIG. 3 may be connected according to one or more requests 468 to create a Generic Route Encapsulation (GRE) tunnel between the virtual traffic hub 420 and the client resources. Alternatively, in some embodiments, an IPSEC VPN tunnel can be created on virtual traffic hub for an external resource using one or more requests 468. Other requests 468 to establish a PIM session and PIM neighbor with the virtual traffic hub can then be performed using the created tunnels, in some embodiments.

Control plane 410 may serve as a centralized store for multicast group data 414 (e.g., members, topology, etc.) as well as other features managed by network configuration service 230, such as isolated network data 412. Instead of performing route tracing, router scraping, or other labor intensive multicast discovery and information gathering techniques, control plane 410 may provide multicast information. For example, a request for multicast group membership may be received, as indicated at 472, which may return account numbers, network address or other identifying information for members. Multicast routes or other multicast configuration information may be requested, as indicated at 474, from control plane 410. For example, interface 400 may provide a query or other search interface, which may allow a request (e.g., 472 or 474) for multicast information to specify various predicates, filters, or other parameters to return desired information. Various other requests (not illustrated) based on collected performance data for a multicast group stored as part of multicast data 414). For example, the X highest traffic sources in a multicast group could be returned responsive to a query based on traffic source amounts.

Multicast group data 414 (as well as isolated network data 412) may be stored in a database or other data storage system which may support various requests for multicast information discussed above. Database systems, for instance, may support the various search and analysis features (e.g., filters, scans, join, aggregation operations, and so on) which can be used to provide the desired information via interface 400.

Other management operations, such as a request to remove a multicast group member 476, may be received and performed by control plane 410. As discussed earlier, control plane 410 may implement controls to permit or deny management operations. If, for instance, a user account associated with the request to remove a multicast group member 476 does not have permission to remove the group member (e.g., the user account is not the creator or owner account of the virtual traffic hub), then the request may be denied. Similar analyses may be performed for other management requests to create, update, or modify the multicast (e.g., a request to change a delivery type for a multicast group, as discussed below with regard to FIG. 5).

Control plane 410 may perform updates 480 to multicast data at virtual traffic hub(s) 420 responsive to requests via interface 400 (e.g., to add or enable new isolated networks for a multicast group). Similarly, management operations (e.g., to perform maintenance operations, increase or allocate new resources, and so on) may be directed by control plane 410. By utilizing control plane 410 to determine, apply, and monitor multicast support for provider network 200, users of multicast implemented in provider network 200 can avoid costly attempts to identify, located, and direct multicast network management or other operations.

Figure 5:
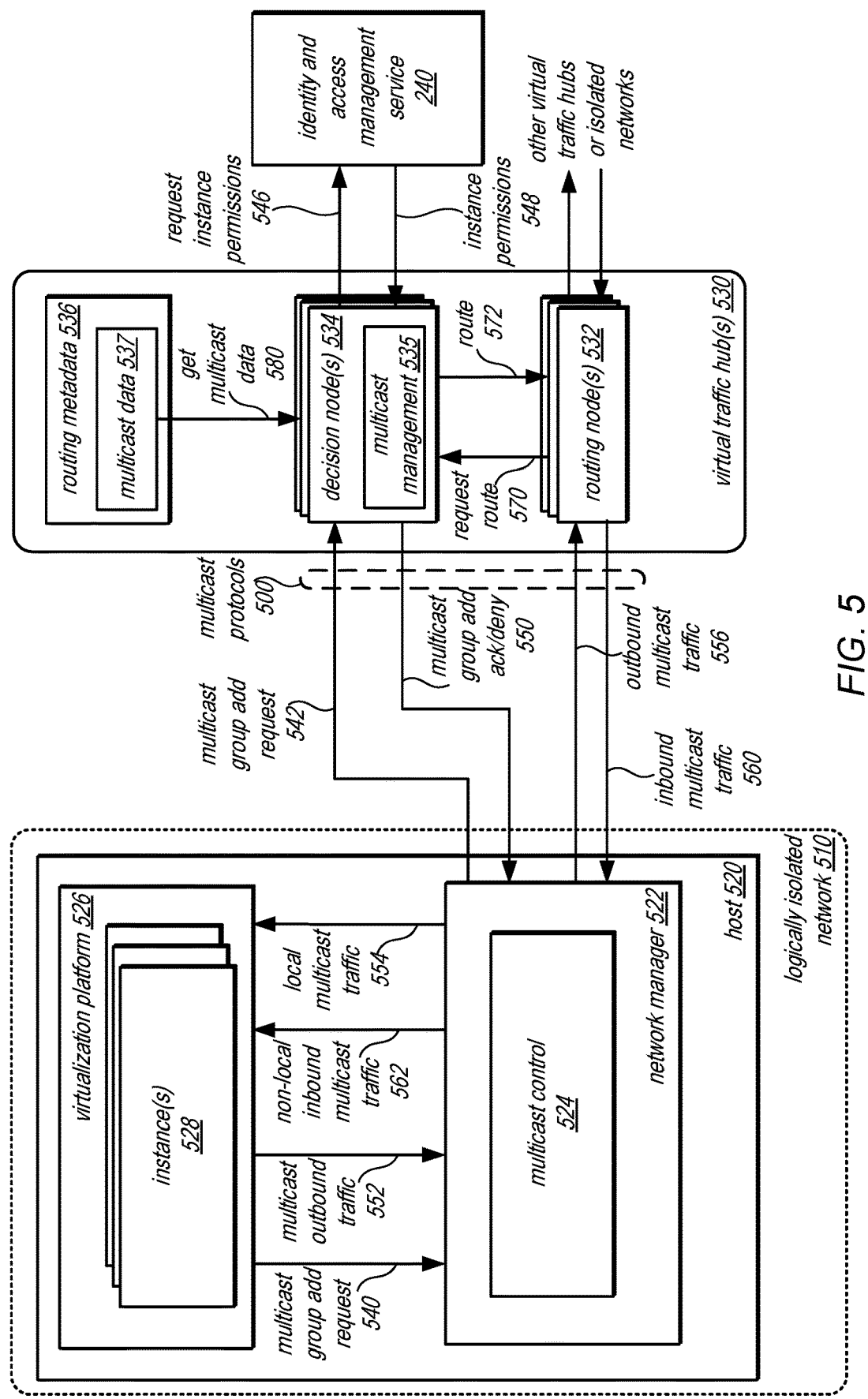
FIG. 5 is a logical block diagram illustrating interactions to route multicast traffic at a virtual traffic hub, according to various embodiments.

Once established, multicast management and use may be handled by multicast group members or resources in attached/enabled isolated networks according to multicast protocols, such as multicast protocols 500 illustrated in FIG. 5. Multiple different multicast protocols 500 may be supported. For example, Protocol Independent Multicast (PIM) is a collection of multicast routing protocols, each optimized for a different environment, including variants such as PIM Sparse Mode (PIM-SM) which explicitly builds unidirectional shared trees rooted at a rendezvous point (RP) per group, and optionally creates shortest-path trees per source, PIM-SM generally scales fairly well for wide-area usage, PIM Dense Mode (PIM-DM), which implicitly builds shortest-path trees by flooding multicast traffic domain wide, and then pruning back branches of the tree where no receivers are present, Bidirectional PIM (Bidir-PIM), which explicitly builds shared bi-directional trees and does not build a shortest path tree, so may have longer end-to-end delays than PIM-SM, and PIM Source-Specific Multicast (PIM-SSM) builds trees that are rooted in just one source, offering a more scalable model for a limited number of applications (mostly broadcasting of content). In another example of a multicast protocol, the Internet Group Management Protocol (IGMP) is a communications protocol may be used by hosts and adjacent routers on IPv4 networks to establish multicast group memberships. Supported versions of IGMP protocols may include IGMPv1, IGMPv2, and IGMPv3. IGMPv2 improves IGMPv1 by adding the ability for a host to signal desire to leave a multicast group. IGMPv3 improves IGMPv2 by supporting source-specific multicast (PIM-SSM) and introduces membership report aggregation. These versions are backwards compatible. A router supporting IGMPv3 can support clients running IGMPv1, IGMPv2 and IGMPv3. In another example, Multicast Listener Discovery (MLD) can be supported (e.g., to establish multicast group memberships for IPv6 hosts).

FIG. 5 is a logical block diagram illustrating interactions to route multicast traffic at a virtual traffic hub, according to various embodiments. Logically isolated network 510 may implement a host system 520. Host system 520 may implement a virtualization platform (e.g., a hypervisor for virtual machine management, Docker or other virtual operating system management, or any other virtualization management layer) and one or more virtual compute instance(s) 528. Instance(s) 528 may make use of a multicast network where logically isolated network 510 is previously attached to virtual traffic hub(s) 530 and where multicast has been enabled for logically isolated network 510 and virtual traffic hub(s) 530 (e.g., according to the requests discussed above in FIG. 4).

Host 520 may implement network manager 522 for the host which may handle network traffic from instance(s) 528. Network manager 522 may implement a local multicast control 524 for multicast communications, in some embodiments. For example, an instance 528 may submit a request to add the instance to a multicast group 540. Network manager 522 may direct the request to network endpoint (or other networking feature not shown) which may submit the request to add 542 to a virtual traffic hub 530.

One or more decision node(s) 534 implemented for virtual traffic hub(s) 530 may implement a multicast management feature 535, which may, among other tasks, validate and perform requests to add or remove members from a multicast group. In some embodiments, multicast group membership can be managed according to criteria related to the requesting instance 528 (e.g., is the instance 528 associated with a particular group of instances in a "security group") or according to features, fields, or parameter values included in the request formatted according to the multicast protocols (e.g., modified or extended field values for IPMG, MLD, or PIM). In some embodiments, identity and access management service 240 may be invoked to provide fine grained multicast membership control via a request 546 for the permissions of that instance 528 to become a member of the multicast group. Identity and access management service 240 may respond with instance permissions 548, from which multicast management 535 can determine whether to add the instance. A response 550 either acknowledging the addition or denial 550 may be returned to network manager 522.

Multicast data packets may be sent from instances 528 and forwarded by virtual traffic hub(s) 530. For example, instance 528 may send outbound traffic 552. Multicast control 524 may check whether a local group member is hosted at host 520. If so, then local multicast traffic 554 may be provided directly, as discussed below with regard to FIG. 8. Outbound multicast traffic 556 may be sent to virtual traffic hub(s) 530 via multicast protocols 500. If routing node(s) 532 have cached the appropriate forwarding route(s) for that multicast route, then routing nodes 532 may send out the packets according to the cached route(s). If not, then a request 570 for a route may be sent to decision node(s) 534 which may result the request (e.g., by getting 580 the appropriate multicast data 537 from routing metadata 536 (e.g., stored in a high performance database, such as an in-memory database or NoSQL database). Decision node(s) 534 may then provide the route 572 to routing node(s) 532.

In at least some embodiments, routing node(s) 532 may support multicast communication with participants communicating with different network protocols. For example, a sender to the multicast group may send requests using Internet Protocol version 6 (IPv6) while one or more of the recipients may only support (or only expect) communications in a different network protocol, Internet Protocol version 4 (IPv4). Routing node(s) 532 may identify the changing in network protocol for data packets in a multicast group and modify, adapt, rewrite, or otherwise change the data packets to conform to the different network protocol before sending the data packets to the recipients. Multicast data 537 may be updated to identify the mappings or changes between network protocols amongst members of a multicast group, so that decision node(s) 534 and routing node(s) 532 can affect the appropriate transformations as part of the multicast flow.

Inbound multicast traffic 560 forwarded on from virtual traffic hub(s) 530 may be sent to host 520 and received at network manager 522. As discussed below with regard to FIG. 8, a delivery type may be applied for multicast traffic, determining when the non-local inbound multicast traffic 562 is delivered to the appropriate instance(s) 528 (e.g., based on a timestamp value included in data packets). For example, multicast data 537 may maintain multicast group configuration information, including multicast delivery type, which may then be propagated or sent to network managers, like network manager 522 to enforce delivery in accordance with the delivery type.

Figure 6:
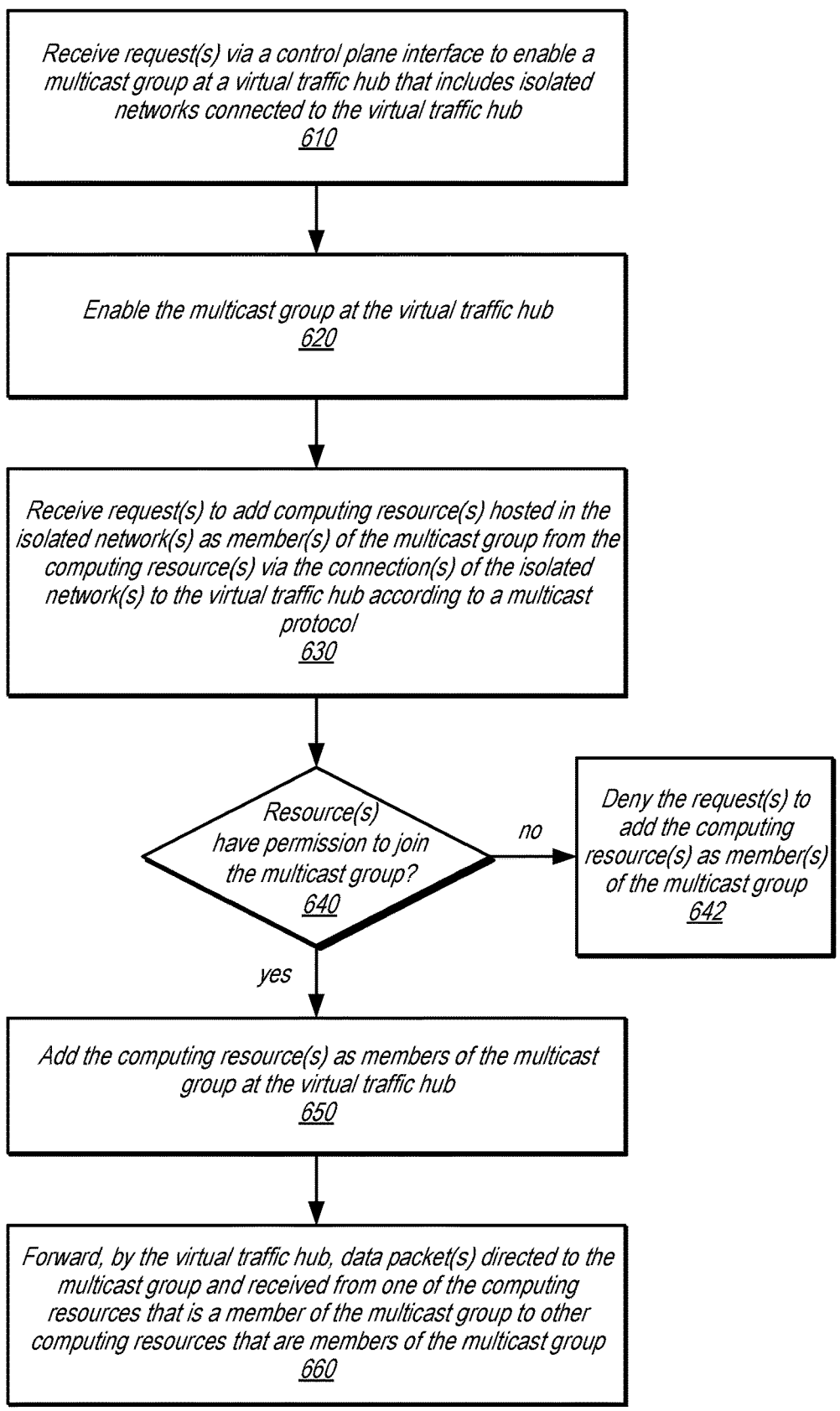
FIG. 6 is a high-level flow chart that illustrates various methods and techniques for managed multicast communications across isolated networks, according to various embodiments.

The examples of managed multicast communications across isolated networks discussed above with regard to FIGS. 2-5 have been given in regard to a provider network. Various other types or configurations of a system or service that hosts network resources for different accounts and allows isolated networks may implement these techniques. Thus, the components such as those discussed above with regard to FIGS. 2-5 may be differently implemented and still perform managed multicast communications across isolated networks. FIG. 6 is a high-level flow chart that illustrates various methods and techniques for managed multicast communications across isolated networks, according to various embodiments. These techniques may be implemented using various components of a provider network as described above with regard to FIGS. 2-5 or other provider network components.

As indicated at 610, one or more request(s) may be received via a control plane interface to enable a multicast group at a virtual traffic hub that includes isolated networks connected to the virtual traffic hub, in some embodiments. For example, as discussed above with regard to FIG. 4, different requests to enable a multicast at a virtual traffic hub and for individual isolated networks may be performed. These requests may include information to configure performance of the multicast group, such as delivery type (discussed below), network protocol switches, permissions or controls for permitting or denying membership request, specifying supported multicast protocols or versions, and so on. As indicated at 620, the multicast group may be enabled at the virtual traffic hub according to the requests, in some embodiments. For example, as noted above the requests may configure certain properties of the multicast group, including properties that identify a delivery type for the multicast group, which may be stored as part of virtual traffic hub metadata and propagated to participants as needed (e.g., in order to perform the correct delivery type). A multicast routing table and other multicast configuration information may be created or configured to prepare for storing multicast routes, in some embodiments.

Once enabled, members of the multicast group can be added. As indicated at 630, request(s) to add computing resource(s) hosted in the isolated network(s) as member(s) of the multicast group may be received from the computing resource(s) via the connections established between the isolated networks and the virtual traffic hub, in some embodiments. The add requests may be received via a multicast protocol, in some embodiments. As indicated at 640, a determination may be made as to whether the resource(s) have permission to join the multicast group, in some embodiments. For instance, metadata associated with the computing resources (e.g., a user account) may be checked against a permissions list. As discussed above with regard to FIG. 5, fine grained access to multicast membership could be implemented so that one computing resource from an isolated network could be allowed to join while another computing resource from the same isolated network could be refused membership in the multicast network.

If the resource(s) do not have permission, then the request(s) to add the computing resource(s) as members of the multicast group may be denied, as indicated at 642. If the resource(s) do have permission, then the computing resource(s) may be added as members of the multicast group at the virtual traffic hub, as indicated at 650.

As indicated at 660, data packet(s) directed to the multicast group and received from one of the computing resources that is a member of the multicast group may be forwarded to other computing resources that are members of the multicast group, in some embodiments. Because the virtual traffic hub can communicate across isolated network boundaries, the multicast traffic can be forwarded from a computing resource in one isolated network to computing resources in different isolated networks (e.g., including external isolated networks, or isolated networks located in different regions or fault tolerant zones).

Figure 7:
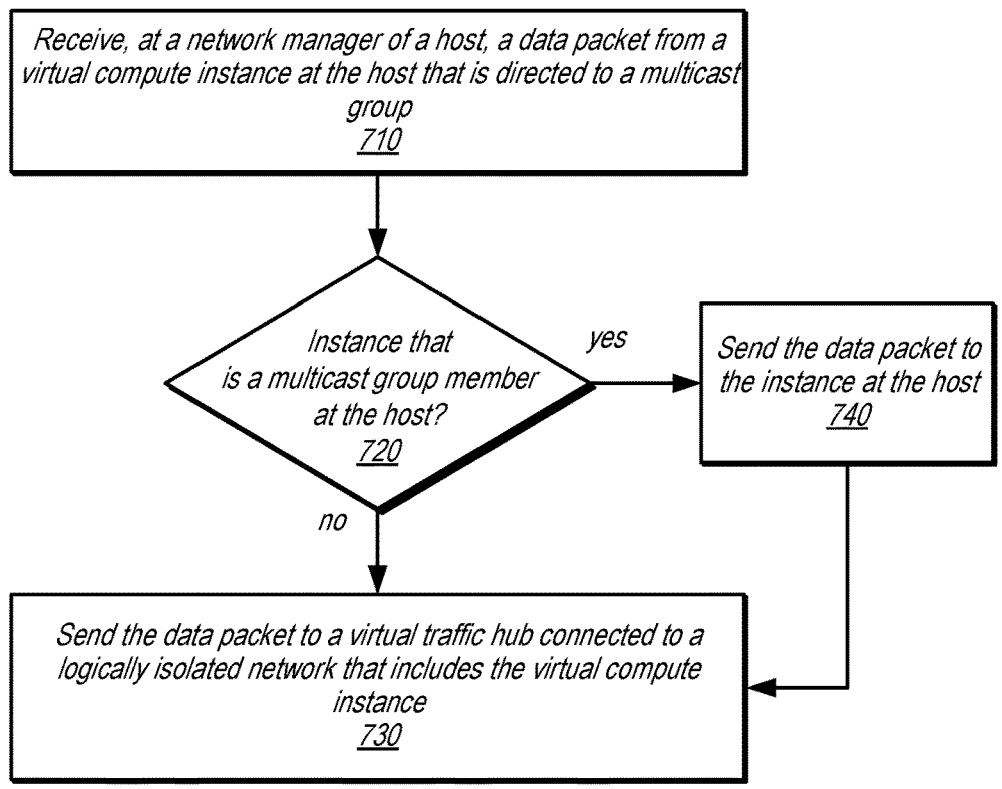
FIG. 7 is a high-level flow chart that illustrates various methods and techniques for local delivery of multicast traffic, according to various embodiments.

FIG. 7 is a high-level flow chart that illustrates various methods and techniques for local delivery of multicast traffic, according to various embodiments. As indicated at 710, a data packet from a virtual compute instance at the host that is directed to a multicast group may be received at a network manager of a host (e.g., similar to network manager 522 in FIG. 5), in some embodiments. As indicated at 720, a determination may be made as to whether an instance is a multicast group member at the host, in some embodiments. For instance, a multicast list for instances at a host may be maintained so that if a multicast group identifier matches an identifier for the multicast group list, the host has an instance that is a member of the multicast group. If an instance is a member, then as indicated at 740, the data packet may be sent directly to the instance at the host (e.g., without sending the network packet over a network, but instead utilizing a local interconnect). If not, then the data packet may be sent over a network to a virtual traffic hub connected to a logically isolated network that includes the virtual compute instance, as indicated at 730.

Figure 8:
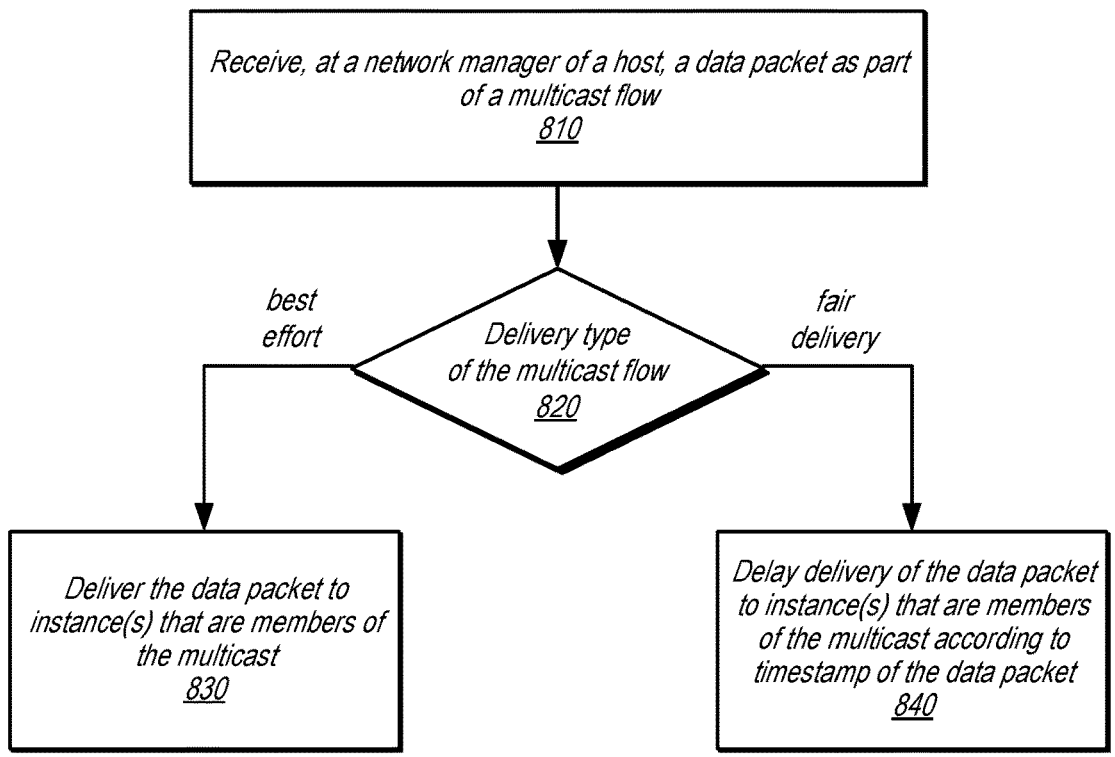
FIG. 8 is a high-level flow chart that illustrates various methods and techniques for delivery types of multicast traffic, according to various embodiments.

FIG. 8 is a high-level flow chart that illustrates various methods and techniques for delivery types of multicast traffic, according to various embodiments. As indicated at 810, a data packet may be received at a network manager of a host (e.g., similar to network manager 522 in FIG. 5) as part of a multicast flow, in some embodiments. As indicated at 820, a determination as to the delivery type for the multicast flow may be made. For instance, delivery type may be propagated along with other multicast configuration information sent to participants in the multicast group. If a best effort delivery type is determined, then the data packet may be delivered to instance(s) at the host that are members of the multicast, as indicated at 830. If a fair delivery type is determined, then delivery of the data packet may be delayed to instance(s) that are members of the multicast according to a timestamp of the data packet, as indicated at 840. For example, a timestamp may be determined so that a furthest recipient can receive the data packet before the time indicated by the timestamp occurs, allowing the data packet to be delivered on or after the timestamp value.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the router data service described herein). The various methods as illustrated in the figures and described herein represent example embodiments of methods. The order of any method may be changed, and various elements may be added, reordered, combined, omitted, modified, etc.

Figure 9:
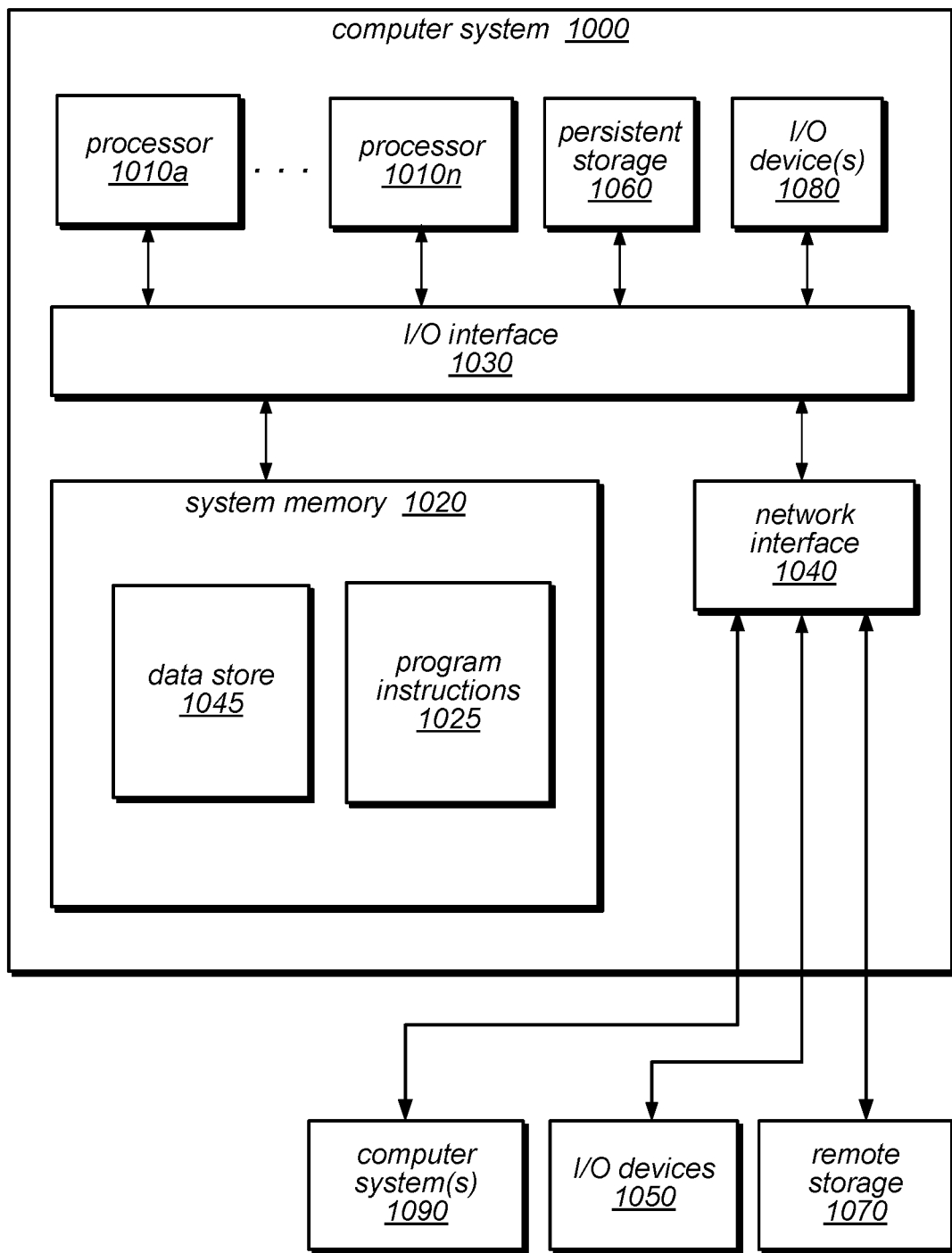
FIG. 9 is a block diagram illustrating an example computing system, according to some embodiments.

Embodiments of managed multicast communications across isolated networks as described herein may be executed on one or more computer systems, which may interact with various other devices. FIG. 9 is a block diagram illustrating an example computer system, according to various embodiments. For example, computer system 1000 may be configured to implement nodes of a provider network, such as may implement various resources, a control plane, virtual traffic hub, computing resources, and/or a client or other external resources, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of compute node, computing node, or computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the system described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a provider network, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. One or more non-transitory computer-readable storage media may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more nodes, endpoints, systems, or services internal to or external to a provider network, and/or clients of the provider network described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
 a first set of computing devices configured to implement a first isolated network;
 a second set of computing devices configured to implement a second isolated network that is logically isolated from the first isolated network;
 at least a first computing device configured to implement a virtual traffic hub in network communication with the first and second isolated networks; and
 at least a second computing device, separate from the at least a first computing device configured to implement the virtual traffic hub, configured to implement a control plane for the virtual traffic hub;
 wherein the control plane is configured to:
  receive one or more requests to enable a multicast group that includes the first isolated network and the second isolated network; and
  cause creation of a multicast routing table at the virtual traffic hub to route communications received at the virtual traffic hub according to one or more multicast routes stored in the multicast routing table in order to enable the multicast group; and
 wherein the virtual traffic hub is configured to:
  receive a request via a multicast protocol from a first computing resource in the first isolated network to add the first computing resource as a member of the multicast group in the multicast routing table;
  add the first computing resource in the first isolated network as a member of the multicast group in the multicast routing table; and
  forward one or more data packets received from the first computing resource and directed to the multicast group to a second computing resource that is another member of the multicast group in the multicast routing table hosted in the second isolated network.

2. The system of claim 1, wherein the control plane is further configured to:
 receive, via an interface, a request for membership of a multicast group; and
 responsive to the request for the routes of the multicast group, provide the membership of the multicast group via the interface.

3. The system of claim 1, wherein a delivery type is specified for the multicast group via the interface of the control plane, and wherein the one or more data packets forwarded by the virtual traffic hub are delivered according to the specified delivery type.

4. The system of claim 1, wherein the control plane and the virtual traffic hub are implemented as part of a network configuration service offered by a provider network, wherein at least one of the first isolated network or the second isolated network is a logically isolated network implemented as part of the provider network, and wherein the first computing resource or the second computing resource of the at least one first isolated network or the second isolated network is a virtual compute instance.

5. A method, comprising:
    enabling, at one or more computing devices that collectively implement a virtual traffic hub, a multicast group that includes a first isolated network connected to the virtual traffic hub and a second isolated network connected to the virtual traffic hub responsive to one or more requests to enable the multicast group received via an interface of a control plane for the virtual traffic hub that is implemented using at least another computing device separate from the one or more computing devices collectively implementing the virtual traffic hub;
    adding, at the virtual traffic hub, a first computing resource in the first isolated network as a member of the multicast group responsive to a request received at the virtual traffic hub from the first computing resource via the connection to the virtual traffic hub according to a multicast protocol; and
    forwarding, by the virtual traffic hub, one or more data packets received from the first computing resource and directed to the multicast group to a second computing resource that is another member of the multicast group hosted in the second isolated network.

6. The method of claim 5, wherein one of the first isolated network or the second isolated network is implemented as part of a provider network, and wherein another one of the first isolated network or the second isolated network is implemented external to the provider network.

7. The method of claim 5, wherein the first computing resource is a virtual compute instance implemented at a host in the first isolated network, wherein a second virtual compute instance at the host is a member of the multicast group, and wherein the method further comprises:
    delivering, by a network manager for the host, the one or more data packets directly to the second virtual compute instance at the host.

8. The method of claim 5, wherein a delivery type is specified for the multicast group via the interface of the control plane, and wherein the one or more data packets forwarded by the virtual traffic hub are delivered according to the specified delivery type.

9. The method of claim 8, wherein the specified delivery type is a fair delivery type, and wherein the method further comprises:
    delivering, by a network manager for a host of the second computing resource the one or more data packets to the second computing resource after a delay determined according to a timestamp included in the one or more packets.

10. The method of claim 5, further comprising:
    receiving, via the interface, a request to enable multicast for the multicast group between the virtual traffic hub and a second virtual traffic hub; and
    responsive to the request enable the multicast for the multicast group between the virtual traffic hub and the second virtual traffic hub, updating the virtual traffic hub and the second virtual traffic hub to perform multicast forwarding between the virtual traffic hub and the second virtual traffic hub.

11. The method of claim 5, further comprising:
    receiving, via the interface, a request for membership of a multicast group; and
    responsive to the request for the routes of the multicast group, providing, by the control plane the membership of the multicast group via the interface.

12. The method of claim 5, further comprising:
    receiving, via the interface, a request for routes of a multicast group; and
    responsive to the request for the routes of the multicast group, providing, by the control plane the routes of the multicast group via the interface.

13. The method of claim 5, further comprising:
    receiving, via the interface, a request to remove an identified member from the multicast group; and
    responsive to the request to remove the identified member, causing, by the control plane, the virtual traffic hub to remove the identified member from the multicast group.

14. One or more non-transitory, computer-readable storage media, storing program instructions that when executed on or across one or more computing devices cause the one or more computing devices to implement:
    receiving, at a virtual traffic hub, instructions to enable a multicast group that includes a first isolated network connected to the virtual traffic hub and a second isolated network connected to the virtual traffic hub from a control plane for the virtual traffic hub according to one or more requests to enable the multicast group received via a control plane interface, wherein the control plane is implemented using a computing device separate from another computing device configured to implement the virtual traffic hub;
    enabling the multicast group at the virtual traffic hub according to the received instructions;
    adding, at the virtual traffic hub, a first computing resource in the first isolated network as a member of the multicast group responsive to a request received at the virtual traffic hub from the first computing resource via the connection to the virtual traffic hub according to a multicast protocol; and
    forwarding, by the virtual traffic hub, one or more data packets received from the first computing resource and directed to the multicast group to a second computing resource that is another member of the multicast group hosted in the second isolated network.

15. The one or more non-transitory, computer-readable storage media of claim 14, wherein one of the first isolated network or the second isolated network is implemented as part of a provider network, and wherein the first isolated network is associated with a first user account of the provider network and the second isolated network is associated with a second user account of the provider network.

16. The one or more non-transitory, computer-readable storage media of claim 14, wherein the first computing resource is implemented at a host in the first isolated network, wherein a third computing resource implemented at the host is a member of the multicast group, and wherein the one or more data packets directly to the third computing resource at the host.

17. The one or more non-transitory, computer-readable storage media of claim 14, wherein the one or more non-transitory, computer-readable storage media comprise further program instructions that when executed by the one or more computing devices cause the one or more computing devices to further implement:
    before adding the first computing resource in the first isolated network as the member of the multicast group, determining, by the virtual traffic hub, that the first computing resource is permitted to join the multicast group.

18. The one or more non-transitory, computer-readable storage media of claim 14, wherein a delivery type is specified for the multicast group via the interface of the control plane, and wherein the one or more data packets forwarded by the virtual traffic hub are delivered according to the specified delivery type.

19. The one or more non-transitory, computer-readable storage media of claim 18, wherein the one or more non-transitory, computer-readable storage media comprise further program instructions that when executed by the one or more computing devices cause the one or more computing devices to further implement sending, by the virtual traffic hub, the delivery type to members of the multicast group.

20. The one or more non-transitory, computer-readable storage media of claim 14, wherein the one or more data packets received from the first computing resource are received according to a first network protocol and wherein the one or more data packets are forwarded by the virtual traffic hub to the second computing resource according to a second network protocol.

* * * * *